United States Patent [19]

Uchida et al.

[11] 4,278,339

[45] Jul. 14, 1981

[54] PENTAGONAL PRISM MODULE FOR CAMERA VIEWFINDER

[75] Inventors: Isamu Uchida; Yasuo Yamazaki, both of Kawachinagano; Takeshi Egawa, Osaka, all of Japan

[73] Assignee: Minolta Camera Kabushiki Kaisha, Osaka, Japan

[21] Appl. No.: 148,596

[22] Filed: May 12, 1980

[30] Foreign Application Priority Data

May 18, 1979 [JP] Japan .............................. 54-67148[U]
May 18, 1979 [JP] Japan .............................. 54-67149[U]

[51] Int. Cl.³ .................... G03B 19/12; G03B 13/08
[52] U.S. Cl. ................................... 354/155; 354/225
[58] Field of Search ................ 354/152, 155, 53, 54, 354/219, 224, 225

[56] References Cited

U.S. PATENT DOCUMENTS

| | | | |
|---|---|---|---|
| 937,266 | 10/1909 | Robertson | 354/224 |
| 2,933,991 | 4/1960 | Saver | 354/53 |
| 3,094,579 | 6/1963 | Papke | 354/225 |
| 3,218,946 | 11/1965 | Lange | 354/219 |
| 3,236,166 | 2/1966 | Steisslinger et al. | 354/219 X |
| 3,668,993 | 6/1972 | Kurie | 354/155 |
| 3,732,775 | 5/1973 | Warstat | 354/225 X |
| 3,846,805 | 11/1974 | Kiyohara et al. | 354/152 X |
| 3,999,194 | 12/1976 | Imura et al. | 354/152 X |

FOREIGN PATENT DOCUMENTS

| | | | |
|---|---|---|---|
| 23782 | 9/1962 | German Democratic Rep. | 354/219 |
| 49-64425 | 6/1974 | Japan | 354/155 |
| 53-65726 | 6/1978 | Japan | 354/155 |
| 867697 | 5/1961 | United Kingdom | 354/152 |

*Primary Examiner*—Donald A. Griffin
*Attorney, Agent, or Firm*—Jackson, Jones & Price

[57] ABSTRACT

A pentagonal prism for use in a viewfinder of a single lens reflex camera makes use of total reflection of viewfinder light flux at effective optical path regions on its pair of roof surfaces. The prism constitutes a module together with a protection cover attachable thereto for protection of the roof surfaces. The cover is provided with a pair of roof walls accomodated to the roof surfaces of the prism and including recessed portions corresponding to the effective optical path regions on the roof surfaces and peripheral portions corresponding to portions on the roof walls out of the effective optical path regions. Upon attachment of the cover to the prism, the peripheral portions contact the portions on the roof surfaces out of the effective optical path regions and an air space which ensures the total reflection is left between the inner surfaces of the recessed portions and the effective optical path regions on the roof surfaces. A ghost may be prevented from occurring when the inner surfaces of the roof walls are black-frosted, black-ground or black-roughened for light absorption or when the roof walls are designed to intersect with one another at a ridge angle of less than 90°.

10 Claims, 10 Drawing Figures

PENTAGONAL PRISM MODULE FOR CAMERA VIEWFINDER

BACKGROUND OF THE INVENTION

1. Field of the Invention

The present invention relates to a pentagonal prism module for use in a viewfinder of a single lens reflex camera.

Conventional pentagonal prisms for use in a viewfinder of a single lens reflex camera have all of their three reflection surfaces metal-coated by silver, aluminum or the like. The use of silver for the metal coating provides each of the reflection surfaces with a high reflection factor of 95% but silver is inferior in durability to aluminum and yet higher in cost. Aluminum is lower in cost and more durable but the use thereof for the metal coating provides each of the reflection surfaces with reflection factor of 85% which is lower than that of silver.

There has been proposed, by for example Japanese Patent Laid Open Publication No. Sho 49-64425, a pentagonal prism in which a refractive index of the prism and an angle formed by a roof ridge and a bottom light incident surface of the prism are properly selected so that total reflection of veiwfinder light influx is possible on a pair of roof reflection surfaces of the prism. With this pentagonal prism, only a lower front surface serving as a third reflection surface is metal-coated and therefore, even when aluminum is used for the metal coating, it is advantageous in that the total reflection factor of all of the three reflection surfaces is about 85% which is almost equal to that of the conventional pentagonal prism having all of the three reflection surfaces metal-coated by silver. Yet, it is more durable and manufactured at a lower cost than the conventional pentagonal prisms.

This pentagonal prism making use of total reflection on the roof surfaces, however, poses a problem in camera manufacturing processes. Upon manufacturing of the conventional pentagonal prisms, all surfaces except for a bottom light incident surface and a rear light exit surface are entirely coated with a black light absorbing paint immediately after the completion of the metal coatings on the reflection surfaces and such a paint serves as a protection film of the metal-coated reflection surfaces, thereby necessitating no special attention during camera manufacturing processes. In contrast thereto, with the pentagonal prism making use of total reflection, the roof surfaces as well as the roof ridge should not be subjected to any coating or painting to ensure total reflection thereon, and accordingly it is exposed to dangers, such as dust adhesion and touch of a worker's hand to roof surfaces and destruction of the roof ridge, whereby a careful attention is required during camera manufacturing processes.

From a practical view point, however, even with the pentagonal prism making use of total reflection, all portions of the roof surfaces are not related to forming a viewfinder image field. Thus, peripheral portions of the roof surfaces out of the effective optical path regions are coated with a black light absorbing paint because, if such peripheral portions are left transparent, undesired lights totally reflected thereon produces a ghost in the view field of a viewfinder. Yet, the painting is applied not only to the peripheral portions of the roof surfaces but also to the lower front surface and even to the side surfaces of the prism. In spite of such application of a black paint, the effective optical path regions on the roof surfaces and the roof ridge which are very important for the optical performance of the pentagonal prism remain exposed. Therefore, when the pentagonal prism is assembled into a camera, those exposed portions should be protected from dust adhesion or damages beforehand in order to improve work efficiency.

SUMMARY OF THE INVENTION

It is, accordingly, a primary object of the present invention to provide a pentagonal prism module which makes use of total reflection of a viewfinder light flux on the roof surfaces and which has the roof surfaces and the roof ridge protected from dust adhesion and damages prior to its assembling into a single lens reflex camera.

Another object of the present invention is to provide a pentagonal prism module of the above feature which can further prevent occurrence of a ghost in the view field of a viewfinder.

A pentagonal prism module of the present invention includes a pentagonal prism adapted to totally reflect a viewfinder light flux at effective optical regions on its pair of roof surfaces. The effective optical path regions on the roof surfaces are left as polished transparent surfaces. The module of the present invention further includes a protection cover designed to complement or fit with the roof surfaces of the prism. The cover is provided with a pair of roof walls having recessed portions corresponding to the effective optical path regions on the roof surfaces of the prism and peripheral portions corresponding to portions on the roof surfaces out of the effective optical path regions. The cover is attachable to the prism for protection of the roof surfaces and the roof ridge with the peripheral portions contacted on the portions of the roof surfaces out of the effective optical path regions. The recessed portions produce an air space between their inner surfaces and the effective optical path regions on the roof surfaces, thereby ensuring total reflection of a viewfinder light flux at the effective optical path regions.

When the module is once completed with the prism and the cover, the roof surfaces and the roof ridge of the prism are surrounded by the cover. As a result, the effective optical path regions on the roof surfaces and the roof ridge which are very important for the optical performance of the prism are thereafter kept free from dust adhesion and damages. This makes it unnecessary to give special attention to the handling of the prism during its manufacturing processes after the module is assembled into a camera, thereby enhancing work efficiency.

One of preferred methods for preventing occurrence of a ghost in the view field of a viewfinder is to provide treatment for reflection prevention on the inner surfaces of at least the peripheral portions on the roof walls of the cover. However, such treatment is unnecessary when the cover is designed such that its roof walls intersect with one another at a ridge angle of less than 90° while the ridge angle of the prism is 90°. Similar treatment for reflection prevention is also applied to the side surfaces of the prism as well as to the lower front surface of the prism coated with a metal such as aluminum for light reflection. Further, similar treatment may be applied to portions on the roof surfaces out of the effective optical path regions. When these portions are not provided with treatment for reflection prevention, it is desirable to bond the peripheral portions on the roof walls of the cover to these portions by a transparent bonding agent which has a refractive index equal to that of the prism. With this construction, an incident light on any portion on the roof surfaces out of the effective optical path regions reaches the corresponding peripheral portion on the roof surfaces of the cover and is then absorbed therein, whereby no ghost is produced.

The cover may be provided with lugs depending from the roof walls to face the side surfaces of the prism and a head portion for covering the triangular upper front surface of the prism. The lugs and head portion may be used as bonding portions when the cover is attached to the prism.

Furthermore, the module may include a pentagonal prism housing for housing the prism.

When the cover is made integral with the pentagonal prism housing by an appropriate means, such as screws or the like, the cover serves as a pressure plate for fixing the pentagonal prism.

The above and other objects and features of the present invention will become more apparent from the following description taken in conjunction with the accompanying drawings.

DESCRIPTION OF THE PREFERRED EMBODIMENTS

Figure 1:
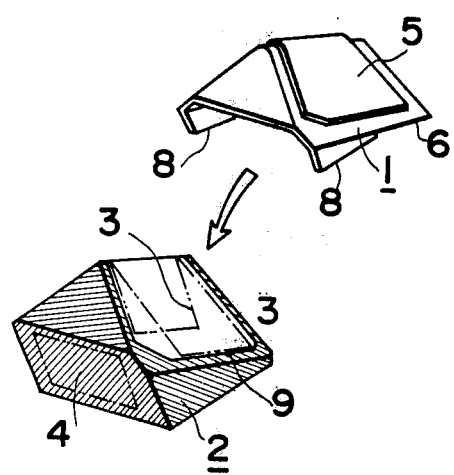
FIG. 1 is an exploded perspective view of a pentagonal prism module according to a first embodiment of the present invention.
Figure 2:
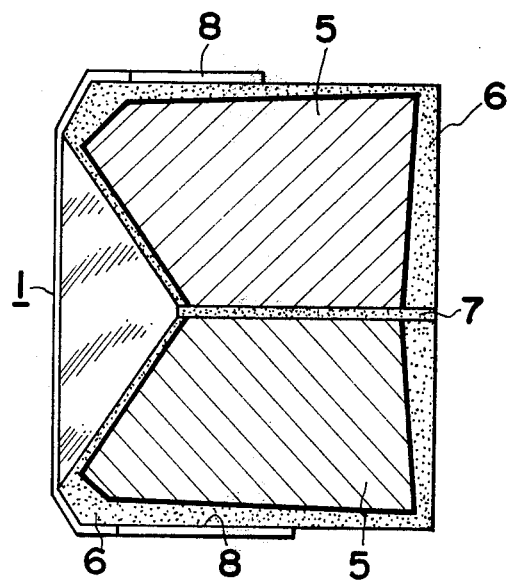
FIG. 2 is a bottom view of a protection cover according to the embodiment of FIG. 1.

Referring to FIGS. 1 and 2, protection cover 1 and pentagonal prism 2 constitutes a pentagonal prism module of the present invention. The portion enclosed by chain line 3 is an effective optical path region on one of roof surfaces of prism 2 and another effective optical path region (not shown) is located on the other of the roof surfaces symmetrically with the region enclosed with chain line 3. On the other hand, the portion enclosed with chain line 4 is yet another effective optical path region on a lower front surface of prism 2. The above effective optical path regions are such regions on which viewfinder lights forming a viewfinder image field are incident. The lower front surface of prism 2 has the effective optical path region thereon coated with a metal such as aluminum and silver and thereafter has its entire area painted black for prevention of light reflection as well as for protection of the metal coating. The roof surfaces of prism 2 have their portions 9 out of the effective optical path regions painted black for prevention of light reflection. A similar black painting is applied to side surfaces and triangular upper front surface of prism 2. In contrast, the effective path regions on the roof surfaces as well as a bottom light incident surface and a rear light exit surface of prism 2 are left as polished transparent surfaces.

Prism 2 is made of a glass having relatively high refractive index nd such as SK2(nd=1.60738) and SSK 1 (nd=1.61720) and the angle formed by a roof ridge and the bottom light incident surface of prism 2 is selected such that viewfinder light having passed through the bottom light incident surface can be totally reflected at both of the effective optical path regions on the roof surfaces. For example, the angle is selected to be 20°50' with prism 2 made of SK2 or SSK1.

Protection cover 1 is formed into a shape for complementing or being accomodated to the roof surfaces and the upper front surface of prism 2, and thus capable of covering the roof ridge and the roof surfaces of prism 2. Portion 6 adapted to contact portions 9 on the roof surfaces of prism 2 surrounds portion 5 which is recessed when seen from the inside of protection cover 1. Lugs 8 depending from the both sides of cover 1 are adapted to contact both side surfaces of prism 2, and cover 1 is attachable to the prism with lugs 8 bonded to the side surfaces of the prism by a bonding agent. Upon the attachment, portion 6 contacts portion 9, and an air space is formed between the effective optical path regions on the roof surfaces of prism 2 and the inner surface of cover 1 because portion 5 is recessed as described above. As a result, total reflection of viewfinder light at the effective optical path regions on the roof surfaces of prism 2 is ensured.

FIG. 2 is a detailed view of the inner surface of cover, seen from the bottom. The inner surfaces of both recessed portion 5 and peripheral portion 6 are black-frosted, black-ground or black-roughened to thereby serves as light absorbing surfaces. A portion of cover 1 adapted to face the roof ridge of prism 2 is formed into groove 7 which prevents cover 1 from contacting the roof ridge of prism 2. When every required treatment has been completed, prism 2 has cover 1 attached thereto and is then forwarded to subsequent camera manufacturing processes.

Figure 3:
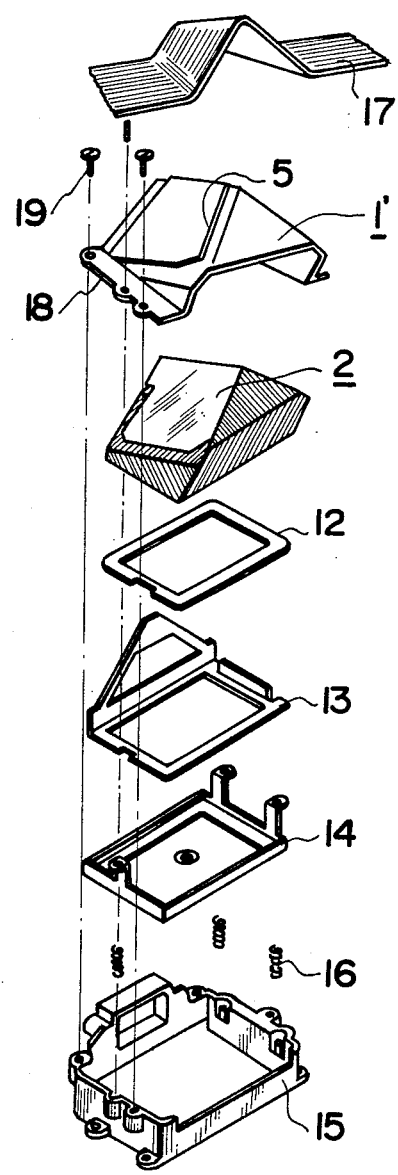
FIG. 3 is an exploded perspective view of a second embodiment of the present invention.

FIG. 3 shows a second embodiment of the present invention, which is constructed to make up a viewfinder block when a protection cover is attached to a pentagonal prism. Protection cover 1' is different from protection cover 1 shown in FIGS. 1 and 2 in that flanges 18 are provided for screw-setting. Also shown in FIG. 3 are viewfinder image field limiting frames 12 and 13, pentagonal prism holder 14 and pentagonal prism housing 15, as well as springs 16 which stabilize the fitting of pentagonal prism 2. These parts 12, 13, 14 and prism 2 are overlaid on pentagonal prism housing 15 in sequence in which they are shown in FIG. 3 and finally protection cover 1' is fixed to pentagonal prism housing 15 by means of screws 19. In this case, it is unnecessary to bond protection cover 1 to pentagonal prism 2 by a bonding agent. Camera control circuit board 17 is attached to the outer surface of protection cover 1'.

Figure 4:
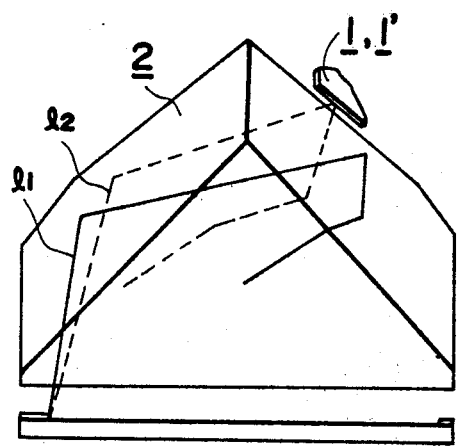
FIG. 4 is a diagram explaining the reasons for a light absorbing surface being formed on an internal surface of the protection cover.

Referring to FIG. 4, explanation is made of the reasons why the inner surfaces of protection cover 1, 1' facing the roof surfaces of pentagonal prism 2 are black-frosted, black-ground or black-roughened. Shown at L1 and L2 are two pencils of light having passed through focusing plate FP at its points corresponding to upper corners of a viewfinder image field. Of the two pencils of light L1 is to enter the pupil center of an eye placed on the optical axis of a viewfinder and L2 is to enter the pupil center when the eye is shifted laterally. Pencil of light 1 is subjected to total reflection on both of the two roof surfaces. In contrast, as an incident angle becomes smaller than the critical angle at one of the roof surfaces acting as a second reflection surface, a part of pencil of light L2 penetrates through the roof surface and strikes against the inner surface of protection covers 1 and 1'. The light is then reflected thereon and enters the eye thereafter. As a result, in response to the shift of the eye, a scene image is darkened at an upper corner of the viewfinder image field with an overlap of a mirror image of the inner surfaces of protection covers 1 and 1'. The viewfinder image field thus becomes obscure. To prevent such a part of light L2 from entering the eye after being reflected on the inner surfaces of protection covers 1 and 1', the black light absorbing surfaces as described are formed on the inner surfaces of protection covers 1 and 1' facing the roof surfaces of pentagonal prism 2.

Figure 5:
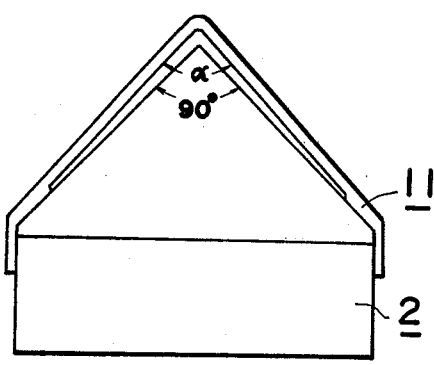
FIG. 5 shows a pentagonal prism module according to a third embodiment of the present invention, wherein the module is observed from the direction of a roof ridge of the pentagonal prism.

FIG. 5 shows a third embodiment of the present invention, wherein a ridge angle α of protection cover 11 facing the roof surface of pentagonal prism 2 is made smaller than the roof ridge angle 90° of pentagonal prism 2. In this case, such light as L2 is reflected on the inner surfaces of protection cover 11 in the directions deviated from the eye. As a result, an effect similar to forming the light absorbing surfaces on the inner surfaces of protection cover 11 can be obtained.

Figure 6:
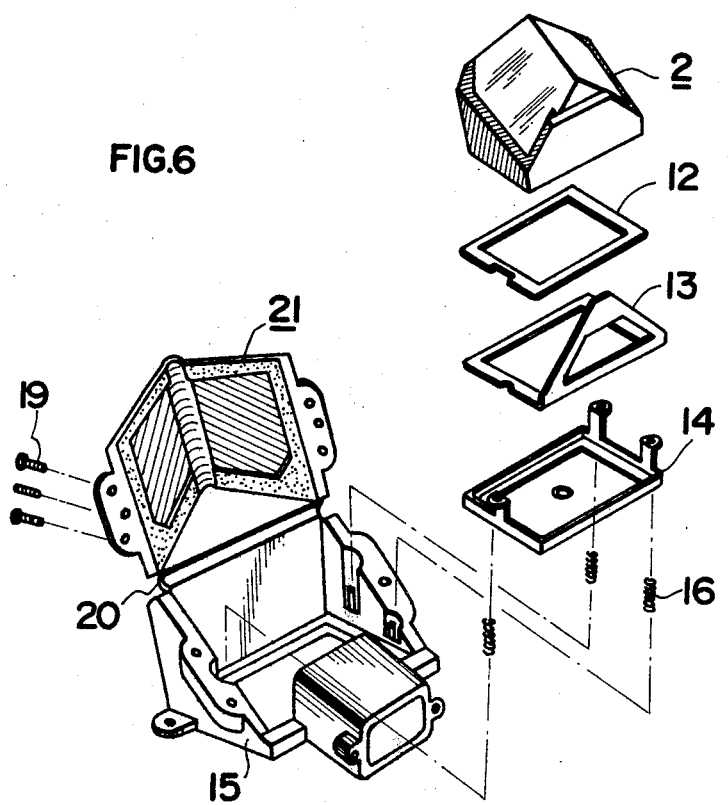
FIG. 6 is an exploded perspective view of a pentagonal prism module according to a fourth embodiment of the present invention.

Shown in FIG. 6 is a modification of the embodiment in FIG. 3, wherein protection cover 21 and pentagonal prism housing 15 are molded to plastic and connected to each other by hinge 20 which is formed of thin plastic. Image field limiting frames 13 and 12 and holder 14, as well as pentagonal prism 2, are inserted into housing 15 with protection cover 21 lifted up about hinge 20 and then cover 21 is secured to housing 15 by screws 19, whereby a viewfinder block is completed.

Figure 7:
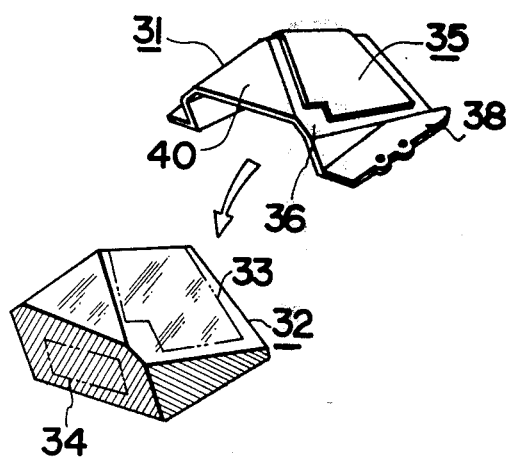
FIG. 7 is an exploded perspective view of a pentagonal prism module according to a fifth embodiment of the present invention.
Figure 8:
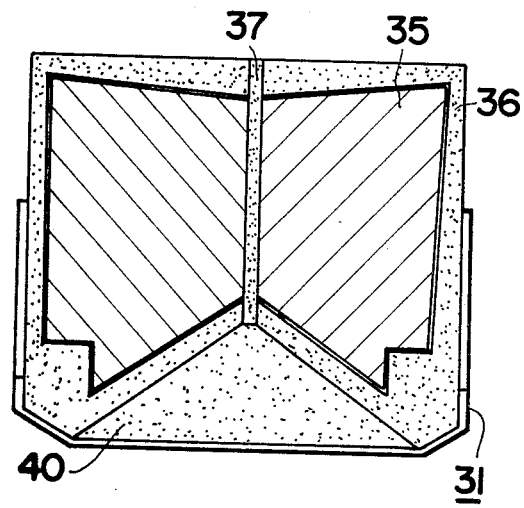
FIG. 8 is a bottom view of the protection cover according to the embodiment of FIG. 7.
Figure 9:
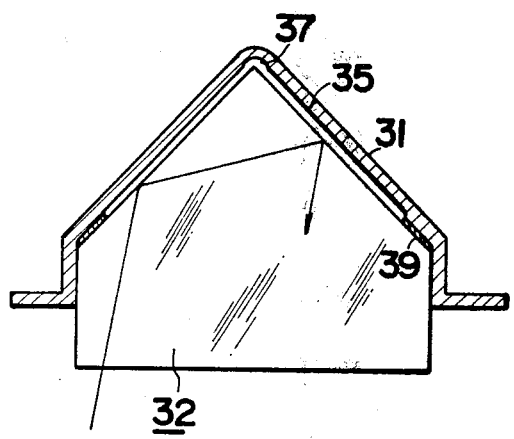
FIG. 9 is a front elevational view of the above embodiment.

FIGS. 7 through 9 show still another embodiment of the present invention. Shown therein are protection cover 31 and pentagonal prism 32. An inner portion enclosed with chain lines 33 on a roof surface of pentagonal prism 32 is an effective optical path region. Another effective optical path region is located on the other roof surface, as in the above embodiments. An inner portion enclosed with chain lines 34 on the lower front surface of pentagonal prism 32 is a third reflection surface coated for reflection. Reflection prevention painting is applied to the lower front surface as well as to both side surfaces of pentagonal prism 32. The roof surfaces and the triangular upper front surface of pentagonal prism 32 are left as polished transparent surfaces. The roof surfaces allow viewfinder light to be totally reflected on their effective optical path regions. The upper front surface of pentagonal prism 32 may be provided with reflection prevention painting. Protection cover 31 is provided with recesses 35 which are recessed when seen from the roof surfaces of pentagonal prism 31, in the regions thereon corresponding to effective optical path regions 33 on the roof surfaces of the prism. The inner surfaces of protection cover 31 are black-frosted, black-ground or black-roughened for light absorption. Peripheral portion 36 of recess 35 is bonded to the roof surfaces of pentagonal prism 32 by transparent bonding agent 39. Triangular top portion 40 of cover 31 adapted to face the upper front surface of pentagonal prism 32 is also bonded to pentagonal prism 32 by a bonding agent applied thereto. When the upper front surface of pentagonal prism 32 is painted, it is unnecessary to apply the transparent bonding agent to top portion 40 of the cover. Bonding agent 39 has a refractive index equal to that of a glass material used for pentagonal prism 2.

Groove 37 is formed at the inner ridge wall of cover 31 adapted to face the roof ridge of pentagonal prism 32. When protection cover 31 is attached to pentagonal prism 32, the groove serves as an undercut which prevents protection cover 31 from striking the roof ridge of pentagonal prism 32, thereby protecting the roof ridge from damage thereof. Flange 38 of protection cover 31 is secured to a pentagonal prism housing (not shown) by screws.

Figure 10:
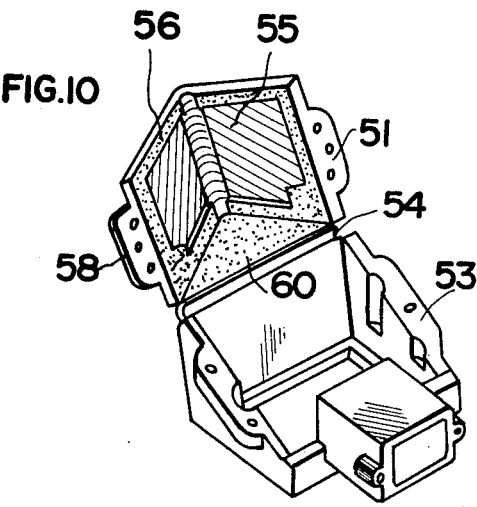
FIG. 10 is a perspective view illustrating the protection cover and the pentagonal prism housing which construct a pentagonal prism module according to a sixth embodiment of the present invention.

FIG. 10 further shows another embodiment of the present invention, wherein protection cover 51 and pentagonal prism housing 53 are made integral by thin hinge 54. The entire unit is molded of synthetic resin. A pentagonal prism, the same as that shown in FIG. 7, is housed in housing 53. A transparent bonding agent is applied to portions 56 and 60 on the internal surfaces of protection cover 51 and protection cover 51 is then raised about hinge 54, thereby covering the pentagonal prism. Subsequent thereto, flange 58 thereof is secured to housing 53 by screws, whereby a viewfinder block is completed.

Protection cover 51 has recess 55 in portions thereof which correspond to effective optical path regions on roof surfaces of the pentagonal prism. An air space is formed between the protection cover and the roof surfaces of the pentagonal prism so that viewfinder lights is totally reflected on the effective optical path regions on the roof surfaces of the pentagonal prism. On the other hand, peripheral portion 56 of recess 55 formed on protection cover 51 is bonded to the roof surfaces of the pentagonal prism by a transparent bonding agent and thus total reflection never occurs out of the effective optical path regions on the roof surfaces of the pentagonal prism. Namely, light incident on any portion out of the effective optical path regions on the roof surfaces strikes portion 56 on protection cover 51 and then absorbed therein.

Protection cover 51 serves as a pressure plate for fixing the pentagonal prism housing in pentagonal prism housing 53. Thus, the pentagonal prism is pressed downwards by protection cover 51 while it is pushed upwards under the action of not shown springs. When used as a pressure plate for the pentagonal prism, protection cover 51 is not always required to be integral with pentagonal prism housing 53 and both may be separately molded.

What is claimed is:

1. A pentagonal prism module for use in a viewfinder of a single lens reflex camera, comprising:
   a pentagonal prism adapted to totally reflect viewfinder light flux at effective optical path regions on its pair of roof surfaces; and a protection cover including a pair of roof walls accomodated to said roof surfaces of said pentagonal prism, said roof walls having recessed portions corresponding to said effective optical regions on said roof surfaces and peripheral portions corresponding to portions on said roof surfaces out of said effective optical path regions, and said protection cover being attachable to said pentagonal prism for protection of said roof surfaces with said peripheral portions contacted on said portions on said roof surfaces out of said effective optical path regions so that an air space is left between said effective optical regions on said roof surfaces and the inner surfaces of said recessed portions.

2. A pentagonal prism module as defined in claim 1, wherein at least the inner surfaces of said peripheral portions of said protection cover are provided with light absorbing property.

3. A pentagonal prism module as defined in claim 1, wherein said roof walls of said protection cover intersects with one another at a ridge angle of less than 90°.

4. A pentagonal prism as defined in claim 1, wherein said protection cover has side lugs hanging downwards from said roof walls and capable of being bonded to the side surfaces of said pentagonal prism.

5. A pentagonal prism module as defined in claim 1, further comprising a pentagonal prism housing which is capable of housing said pentagonal prism.

6. A pentagonal prism module as defined in claim 5, wherein said protection cover constitutes a pressure plate for fixing said pentagonal prism housed in said pentagonal prism housing.

7. A pentagonal prism module as defined in claim 5, wherein said protection cover and said pentagonal prism housing are molded of a platic into an integral unit and said integral unit has a hinge of a thin plastic for connecting said protection cover with said pentagonal prism housing.

8. A pentagonal prism module as defined in claim 1, wherein said portions on said roof surfaces out of said effective optical path regions are treated for reflection prevention.

9. A pentagonal prism module as defined in claim 1, wherein said peripheral portions of said protection cover is bonded to said portions on said roof surfaces out of said effective optical path regions by a transparent bonding agent whose refractive index is equal to that of said pentagonal prism.

10. A pentagonal prism module as defined in claim 1, wherein said protection cover has formed a groove at a position adapted to face the roof ridge of said pentagonal prism when said protection cover is attached to said pentagonal prism.

* * * * *

UNITED STATES PATENT AND TRADEMARK OFFICE
CERTIFICATE OF CORRECTION

PATENT NO. : 4,278,339                 Page 1 of 3
DATED : July 14, 1981
INVENTOR(S) : Isamu Uchida; Yasuo Yamazaki It is certified that error appears in the above—identified patent and that said Letters Patent is hereby corrected as shown below:

Column 1, line 10, insert on line before beginning of paragraph the following title:
Description of the Prior Art.

Column 1, line 19, after "with" insert --a--.

Column 1, line 55, delete "a".

Column 1, line 59, delete "related to" and insert --necessary for--.

Column 2, line 36, delete "the" and insert --those--.

Column 2, line 54, after "of" insert --the--.

Column 2, line 54, after "preventing" insert --the--.

Column 2, line 57, delete "on" and insert --of--.

Column 3, line 58, after "2" insert --a--.

Column 3, line 58, after "and" insert --a--.

Column 3, line 61, after "one of" insert --the--.

UNITED STATES PATENT AND TRADEMARK OFFICE
CERTIFICATE OF CORRECTION

PATENT NO. : 4,278,339
DATED : July 14, 1981
INVENTOR(S) : Isamu Uchida; Yasuo Yamazaki It is certified that error appears in the above—identified patent and that said Letters Patent is hereby corrected as shown below:

Column 4, line 15, after "having" insert --a--.

Column 4, line 25, after "being" delete "accomodated" and insert --accommodated--.

Column 4, line 43, after "surface of" insert --a--.

Column 4, line 64, after "15 in" insert --the--.

Column 5, line 8, delete "its".

Column 5, line 8, after "to" insert --the--.

Column 5, line 16, after "part of" insert --the--.

Column 6, line 14, after "for" insert --the--.

Column 6, line 27, after "by" insert --a--.

Column 6, line 52, after "and" insert --is--.

Column 6, line 58, after "of" insert --,--.

Column 6, line 58, after "shown" insert --,--.

UNITED STATES PATENT AND TRADEMARK OFFICE
CERTIFICATE OF CORRECTION

PATENT NO. : 4,278,339

DATED : July 14, 1981

INVENTOR(S) : Isamu Uchida; Yasuo Yamazaki

It is certified that error appears in the above—identified patent and that said Letters Patent is hereby corrected as shown below:

Claim 4, line 2, delete "downwards" and insert --downward--.

Claim 9, line 20, delete "is" and insert --are--.

Signed and Sealed this

Fourth Day of May 1982

[SEAL]

Attest:

GERALD J. MOSSINGHOFF

Attesting Officer — Commissioner of Patents and Trademarks